(No Model.)

S. BRAY.
CAR COUPLING.

No. 255,761. Patented Apr. 4, 1882.

Witnesses:
L. L. Gerry.
W. R. Marble

Inventor.
Sanford Bray,
By Sylvenus S. Walker
Attorney

UNITED STATES PATENT OFFICE.

SANFORD BRAY, OF BOSTON, MASSACHUSETTS.

CAR-COUPLING.

SPECIFICATION forming part of Letters Patent No. 255,761, dated April 4, 1882.

Application filed February 1, 1882. (No model.)

*To all whom it may concern:*

Be it known that I, SANFORD BRAY, of Boston, in the county of Suffolk and State of Massachusetts, have invented certain new and useful Improvements in Car-Couplings, of which the following is a specification.

My invention relates to that class of car-couplings wherein hooks are employed to couple the adjacent cars together; and the objects of my invention are to so construct the hooks and their operating devices that they may be easily applied to the common draw-bar heads now in general use; and a further object is to so construct the coupling-hooks that they may be set in such position as to couple with a like hook provided in an opposite draw-bar when the two draw-bars are brought together, and when desired either one or both of said hooks may be turned to one side of the mouth of the draw-bar or out of line therewith, so as to prevent said hooks from coupling when brought together; and it consists in the construction, combination, and arrangement of a short hook secured rigidly to a pivot, which has bearings in the top and bottom portions of the mouth of the draw-bar, so as to permit being swiveled or turned therein by means of a spring-bar or operating-lever pivoted to the upper end of the said pivot of the hook, which extends upward a sufficient distance above the top surface of the draw-bar head for the purpose, said spring-bar or operating-lever being temporarily held in position by a hook or notch formed upon the end of the car, and adapted to receive the outer end of the same when the coupling-hook is in the position to contact with the opposite coupling-hook when brought into contact or together with force, so as to press the hooks laterally until their points pass each other by the yielding of the said spring-bar or operating-lever, or by the yielding partially of each spring-lever connected with each coupling-hook, said operating-levers or spring-bars being adapted to be removed by hand from such positions by being raised upward and turned over to the opposite side of the car, and thus turning the pivot and coupling-hook connected thereto, so as to retain it in position at the opposite end of the draw-bar mouth or out of line, so as to prevent coupling, the hook being held in this position by means of the operating-lever or spring-bar being received within a vertical or suitable notch or hook upon the end of the car, as before set forth, and as hereinafter more fully described and set forth in the claim.

Figure 1:
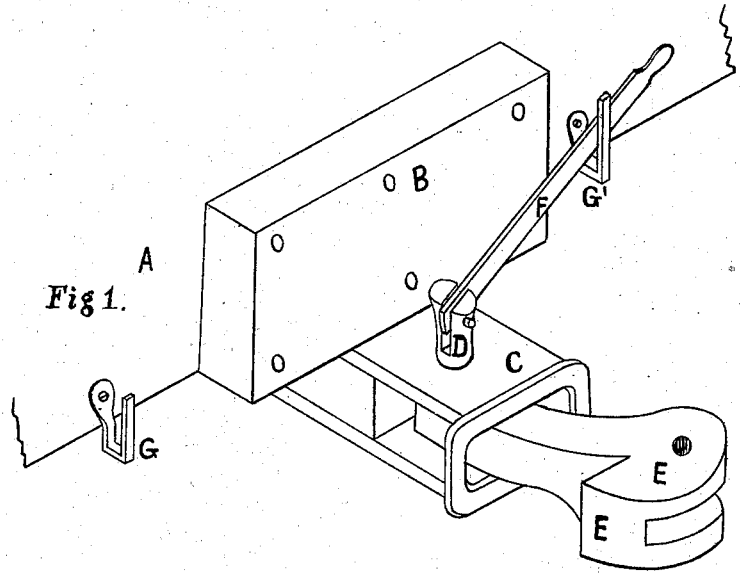
Figure 2:
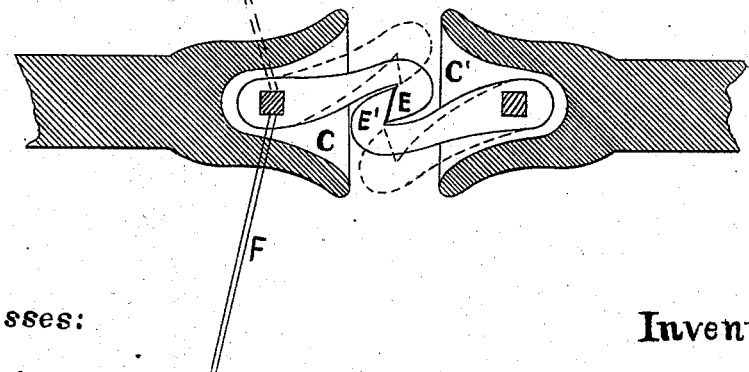

Figure 1 represents a perspective view of my invention as applied to a common wrought-iron draw-bar head, and in position on the end of a freight-car. Fig. 2 represents a horizontal sectional plan of two draw-bar heads coupled together, showing the position of one hook and lever in dotted lines when the same is uncoupled.

A represents the end of a common freight-car provided with the usual "dead-wood" B, and beneath which is the common wrought-iron draw-bar, C, through the top and bottom portions of which are formed the usual pin-holes, and within which is fitted the pivot D, provided at its middle portion with suitable means to retain it firmly within a hole formed within or through the rear end portion of the short coupling-hook E. This hole may be made of square or rectangular form, and the said pivot D fitted so as to be received snugly, or so as to prevent its turning therein, the head portion of this pivot D extending upward above the upper surface of the said draw-bar C, and enlarged somewhat and provided with a vertical slot formed therein at a right angle to the line of the said hook E; and within this slot is pivoted one end of the spring-bar or operating lever F, being formed of spring-steel and adapted to yield or spring horizontally when its outer end is placed or temporarily confined within the catch or hook G and the opposite draw-bar hook, E', is brought into contact forcibly with the said hook E, the incline or curved faces acting upon each other so as to force each laterally from its true position or out of line by bending the said spring-bar or operating-levers F sufficiently to permit the ends or points of the said coupling-hooks E E' to pass each other and engage or hook together through the action of the said spring-bar or operating-lever F returning to its normal position. Now, in order to uncouple the said hooks E E', the said spring-bar or operating-lever F is freed or disengaged at its outer end from the catch-fastening or vertical hook G and raised upward past the pivotal connection D, and is then turned down in the opposite direction and swung backward or toward the end of the car, and placed within the catch-fastening or opposite hook, G', as shown by the dotted lines in Fig. 2, thus turning the said coupling-hook E out of position or out of line with the opposite coupling-hook, E', connected or pivoted within the mouth of the opposite draw-bar, C', so as to prevent the said coupling-hooks E E' from coupling or engaging with each other when required to run two cars together, and thereby prevent the possibility of their becoming coupled together excepting when desired.

It will be evident from the construction thus described and shown that, if found desirable, the said pivot D might be extended upward so as to reach the top of a freight-car, and have pivoted to the upper end thereof the said spring-bar or operating-lever F, so as to operate the said coupling-hooks from the top of the car, in precisely the same manner as described in the former case, without departing from the invention contemplated; but as such a modification does not require any different devices from those shown in the drawings, I have not shown the extended rod in this connection.

Being well aware that coupling-hooks are old and well known and have been provided with flat and other yielding springs adapted to operate in a great variety of ways, I do not broadly claim any such devices, as they alone would not serve the purposes contemplated by my invention, which consists principally in the manner of holding, adjusting, changing, and operating said hooks, in connection with a common draw-bar, as pointed out in the foregoing description, and shown in the drawings.

Having thus described my invention, what I claim is—

The combination, with the common draw-bar, C, of the short coupling-hook E, rigidly secured to the pivot D, which extends upward through said draw-bar, and having pivoted to the upper end thereof the operating spring-bar F, by which the said hook may be turned to either side of the draw-bar mouth and be held in position to couple or not, as desired, substantially as shown and described.

SANFORD BRAY.

Witnesses:
SYLVENUS WALKER,
W. R. MARBLE.